United States Patent
Eguchi

(10) Patent No.: US 9,661,168 B2
(45) Date of Patent: May 23, 2017

(54) IMAGE FORMING APPARATUS, METHOD FOR SETTING APPARATUS, AND COMPUTER-READABLE MEDIUM

(71) Applicant: Oki Data Corporation, Tokyo (JP)

(72) Inventor: Hiroshi Eguchi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/072,771

(22) Filed: Mar. 17, 2016

(65) Prior Publication Data
US 2016/0352946 A1  Dec. 1, 2016

(30) Foreign Application Priority Data

May 29, 2015 (JP) .................................. 2015-110265

(51) Int. Cl.
*H04N 1/00* (2006.01)
*H04N 1/32* (2006.01)
(Continued)

(52) U.S. Cl.
CPC ........... *H04N 1/00891* (2013.01); *G06F 3/00* (2013.01); *G06F 3/1292* (2013.01); *G06K 15/1809* (2013.01); *G06K 15/4005* (2013.01); *G06K 15/4055* (2013.01); *H04N 1/00307* (2013.01); *H04N 1/00315* (2013.01);
(Continued)

(58) Field of Classification Search
USPC ....................................................... 358/1.13
See application file for complete search history.

(56) References Cited

U.S. PATENT DOCUMENTS

2009/0195812 A1\* 8/2009 Park .................... G06F 21/35
358/1.15
2009/0284790 A1\* 11/2009 Ohashi ................. G06F 21/35
358/1.15
(Continued)

FOREIGN PATENT DOCUMENTS

EP  2566209 A1  3/2013
JP  2009160746 A  7/2009

OTHER PUBLICATIONS

Extended Search Report issued Dec. 12, 2016 in EP Application No. 16160493.9.

*Primary Examiner* — Ngon Nguyen
(74) *Attorney, Agent, or Firm* — Panitch Schwarze Belisario & Nadel LLP

(57) ABSTRACT

An image forming apparatus includes: a memory configured to store identification information identifying an information terminal device and mode information indicating a mode corresponding to the information terminal device in association with each other; a communication interface configured to receive from the information terminal device a wireless signal including identification information that is stored in the information terminal device and identifies the information terminal device, and determine an intensity of the received wireless signal; and a controller configured to, when determining that the determined intensity of the received wireless signal is equal to or greater than a predetermined intensity, read from the memory the mode information corresponding to the identification information included in the received wireless signal, and set the image forming apparatus to the mode indicated by the read mode information.

20 Claims, 6 Drawing Sheets

(51) Int. Cl.
*H04W 24/08* (2009.01)
*G06F 3/12* (2006.01)
*G06F 3/00* (2006.01)
*G06K 15/02* (2006.01)
*G06K 15/00* (2006.01)

(52) U.S. Cl.
CPC ........ *H04N 1/32101* (2013.01); *H04W 24/08* (2013.01); *H04N 2201/0094* (2013.01)

(56) References Cited

U.S. PATENT DOCUMENTS

| | | | |
|---|---|---|---|
| 2009/0286028 A1* | 11/2009 | Garver | B29C 47/0023 428/36.7 |
| 2012/0133971 A1 | 5/2012 | Park | |
| 2013/0050741 A1 | 2/2013 | Raja et al. | |
| 2013/0262184 A1* | 10/2013 | Jain | G06Q 30/0205 705/7.34 |
| 2014/0355047 A1* | 12/2014 | Lee | G06F 3/1292 358/1.15 |

* cited by examiner

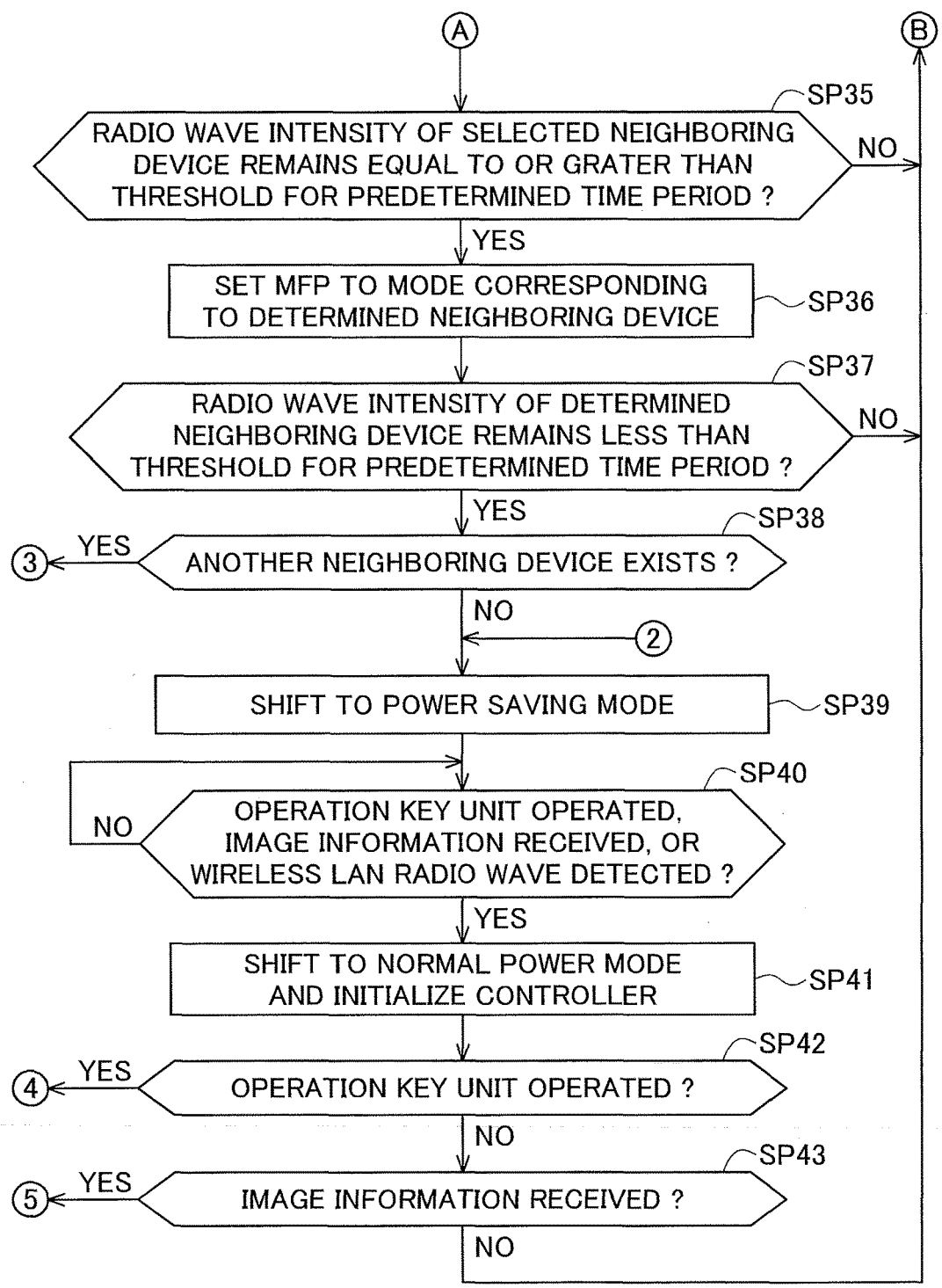

IMAGE FORMING APPARATUS, METHOD FOR SETTING APPARATUS, AND COMPUTER-READABLE MEDIUM

BACKGROUND OF THE INVENTION

1. Field of the Invention

The present invention relates to an image forming apparatus, a method for setting an apparatus, and a computer-readable medium, and more particularly, to an image forming apparatus that forms an image on a recording medium by using an electrophotographic method.

2. Description of the Related Art

Japanese Patent Application Publication No. 2009-160746 discloses a printer including a reader for communicating with a non-contact integrated circuit (IC) card. When the non-contact IC card is brought close to the reader, the printer reads data from the non-contact IC card by the reader and prints print data.

SUMMARY OF THE INVENTION

An aspect of the present invention is intended to provide an image forming apparatus, a method for setting an apparatus, and a computer-readable medium that are capable of improving user-friendliness.

According to an aspect of the present invention, there is provided an image forming apparatus including: a memory configured to store identification information identifying an information terminal device and mode information indicating a mode corresponding to the information terminal device in association with each other; a communication interface configured to receive from the information terminal device a wireless signal including identification information that is stored in the information terminal device and identifies the information terminal device, and determine an intensity of the received wireless signal; and a controller configured to, when determining that the determined intensity of the received wireless signal is equal to or greater than a predetermined intensity, read from the memory the mode information corresponding to the identification information included in the received wireless signal, and set the image forming apparatus to the mode indicated by the read mode information.

According to another aspect of the present invention, there is provided a method for setting an apparatus, the method including: receiving, by a communication interface, from an information terminal device, a wireless signal including identification information that is stored in the information terminal device and identifies the information terminal device; determining, by a signal intensity determiner, an intensity of the wireless signal received from the information terminal device; determining, by a determiner, whether the determined intensity of the received wireless signal is equal to or greater than a predetermined intensity; and when it is determined that the determined intensity of the received wireless signal is equal to or greater than the predetermined intensity, reading mode information corresponding to the identification information included in the received wireless signal and indicating a mode corresponding to the information terminal device, from a memory storing the identification information and the mode information in association with each other, and setting, by a setter, the apparatus to the mode indicated by the read mode information.

According to another aspect of the present invention, there is provided a computer-readable medium storing a program causing a computer to execute a process for setting an apparatus, the process including: receiving from an information terminal device a wireless signal including identification information that is stored in the information terminal device and identifies the information terminal device; determining an intensity of the wireless signal received from the information terminal device; determining whether the determined intensity of the received wireless signal is equal to or greater than a predetermined intensity; and when it is determined that the determined intensity of the received wireless signal is equal to or greater than the predetermined intensity, reading mode information corresponding to the identification information included in the received wireless signal and indicating a mode corresponding to the information terminal device, from a memory storing the identification information and the mode information in association with each other, and setting the apparatus to the mode indicated by the read mode information.

BRIEF DESCRIPTION OF THE DRAWINGS

In the attached drawings:

FIGS. 5 and 6 are a flowchart illustrating a print process procedure.

DETAILED DESCRIPTION OF THE INVENTION

Embodiments of the present invention will now be described with reference to the drawings.

<1. First Embodiment>
<1-1. Configuration of MFP>

Figure 1:
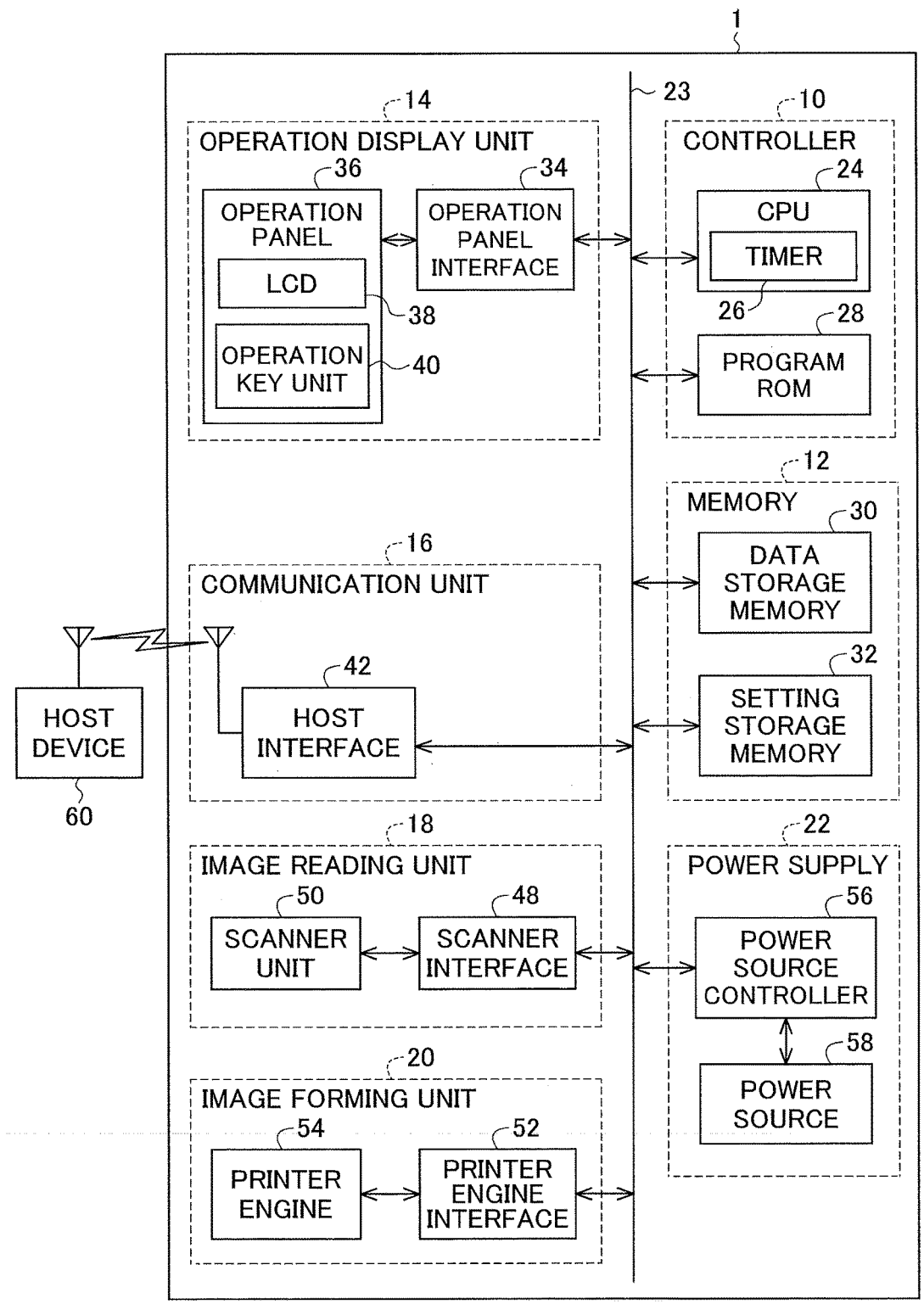
FIG. 1 is a block diagram illustrating a functional configuration of a printer according to a first embodiment.

FIG. 1 illustrates a multifunction printer or peripheral (MFP) 1. The MFP 1 has multiple functions, such as printing, image scanning, faxing, and copying. The MFP 1 includes a controller (or control unit) 10, a memory (or storage unit) 12, an operation display unit (or operation display) 14, a communication unit (or communication interface) 16, an image reading unit (or image reader) 18, an image forming unit (or printing device) 20, and a power supply (or power supply unit) 22. These units are connected to each other via an address data bus 23. The communication unit 16 serves as a signal intensity determination unit (or signal intensity determiner). The controller 10 serves as a determination unit (or determiner) and a setting unit (or setter).

The controller 10 includes a central processing unit (CPU) 24 and a program read only memory (ROM) 28. The CPU 24 reads a predetermined program from the program ROM 28 and executes it, thereby performing system control of the entire MFP 1, management of the flow of image information, or the like and controlling the. MFP 1. The CPU 24 includes a timer 26 and can measure a predetermined time period in accordance with control program data stored in the program ROM 28.

The memory 12 includes a data storage memory 30 and an apparatus setting information storage memory (referred to below simply as the setting storage memory) 32. The data storage memory 30 is a memory for storing image information. The setting storage memory 32 is a memory for storing information regarding operation of the MFP 1. The CPU 24 reads and stores information from and in the setting storage memory 32 via the address/data bus 23.

Figure 2:
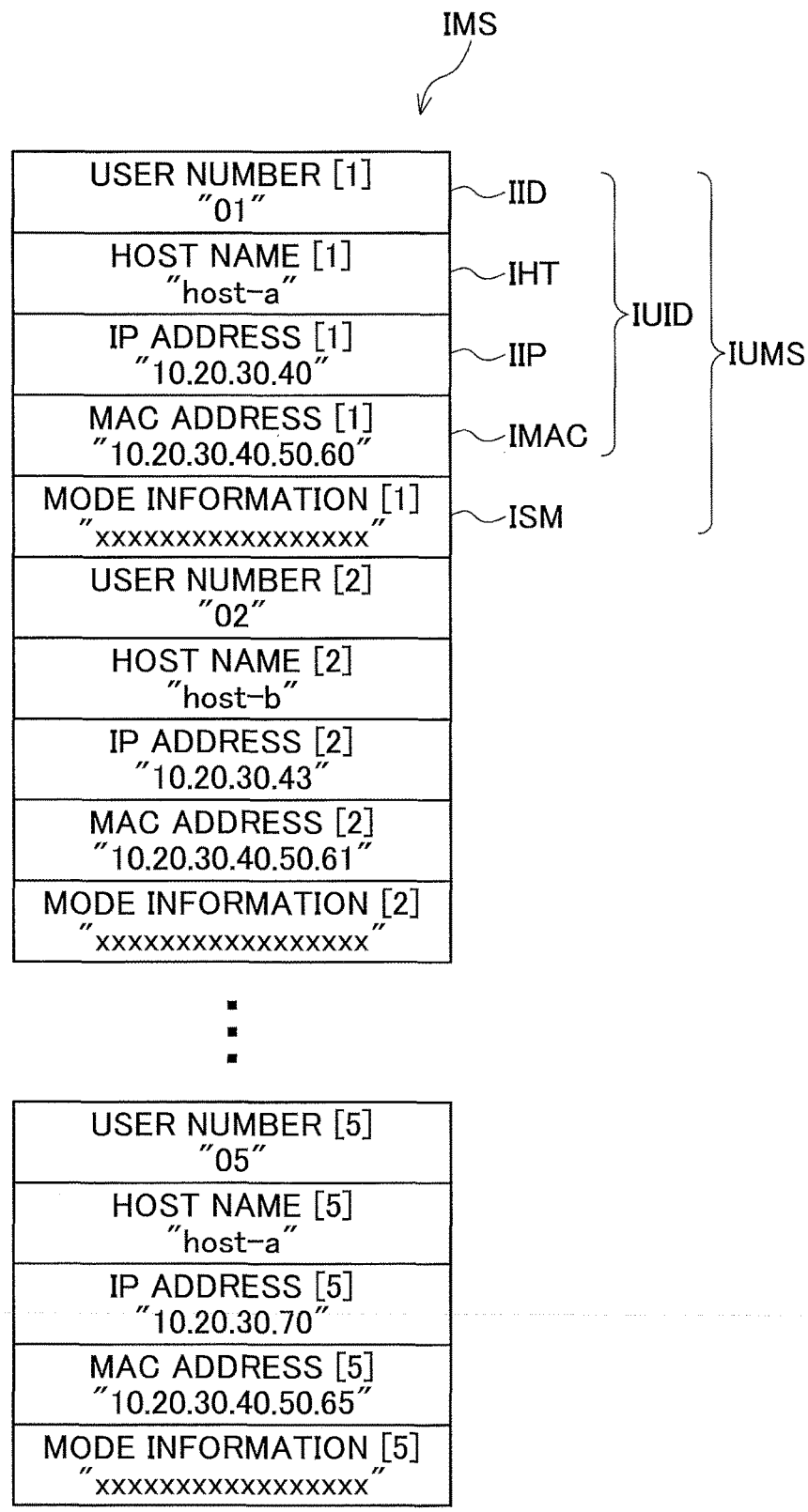
FIG. 2 is a diagram illustrating apparatus setting information.

As illustrated in FIG. 2, the setting storage memory 32 stores apparatus setting information IMS. The apparatus setting information IMS includes, for each of one or more users of the MFP 1, user apparatus setting information IUMS unique to the user. The user apparatus setting information IUMS includes a user identification information item IUID that is identification information unique to a host device 60 as an information terminal device carried by the user and a mode information item (or apparatus setting mode information item) ISM corresponding to the user identification information item IUID. The user identification information item IUID consists of a user number IID, a host name IHT, an internet protocol (IP) address IIP, and a media access control (MAC) address IMAC. For each of the user identification information items IUID stored in the setting storage memory 32, an information item identical to the user identification information item IUID is registered in the host device 60 carried by the user to which the user identification information item IUID is assigned. The mode information item ISM indicates a mode (or operating mode) of the MFP 1 corresponding to the host device 60. The mode information item ISM is information indicating settings regarding operation modes, such as a copy mode, a scan mode, and a print mode, and resolution, paper setting, a duplex mode, or the like in each of the operation modes. The apparatus setting information IMS is predetermined and stored in the setting storage memory 32 prior to printing.

Referring again to FIG. 1, the operation display unit 14 serves as an operation unit or user interface. The operation display unit 14 includes an operation panel 36 and an operation panel interface 34. The operation panel 36 includes a liquid crystal display (LCD) 38 and an operation key unit 40. The operation panel 36 serves as a man-machine interface between the MFP 1 and a use The LCD 38 is a display for displaying information input by a user, a control state of the MFP 1, or other information. The operation key unit 40 includes keyboard switches by which a user can input desired control content or other information. The operation panel interface 34 is between the address/data bus 23 and the operation panel 36 and is an interface circuit for sending and receiving signals. By operating the operation key unit 40, a user can set the user identification information item IUID (user number IID, host name IHT, IP address IIP, MAC address IMAC, etc.) that is unique information identifying the host device 60 carried by the user, and the mode information item ISM indicating functions and settings usually used by the user for printing in the MFP 1. The CPU 24 receives setting information from users via the operation panel interface 34 and stores content of the received setting information in the setting storage memory 32 as the apparatus setting information IMS.

The communication unit 16 includes a host interface 42. The CPU 24 can communicate with a host device 60 via the host interface 42. The host interface 42 is an interface conforming to wireless local area network (LAN) standards, such as Institute of Electrical and Electronics Engineers (IEEE) 802.11a/b/g/n/ac. The host interface 42 sends and receives, to and from a host device 60, image information, apparatus information, or other information. The host device 60 is a portable mobile device, such as a personal computer, a smartphone, or tablet, including an interface conforming to wireless LAN standards, such as IEEE 802.11a/b/g/n/ac, similarly to the MFP 1. The host device 60 is carried by the user.

The image reading unit 18 includes a scanner unit 50 and a scanner interface 48. The scanner unit 50 reads an original to obtain image information. The scanner interface 48 is an interface circuit for transferring image information from the scanner unit 50, and sending and receiving control signals, in accordance with instructions from the CPU 24.

The image forming unit 20 includes a printer engine 54 and a printer engine interface 52. The printer engine 54 receives image information and prints an image on a printing paper sheet in accordance with the received image information. The printer engine interface 52 is an interface circuit for transferring image information to the printer engine 54, and sending and receiving control signals, in accordance with instructions from the CPU 24.

The power supply 22 includes a power source (or power source unit) 58 and a power source controller (or power source control unit) 56. The power source 58 supplies electrical power to components in the MFP 1 under control of the power source controller 56. The power source controller 56 controls the power source 58 to turn on and off the power supply to the components in the MFP 1. An on/off setting of the power supply can be set through the operation panel 36.

<1-2. Print Setting Process Procedure>

Next, a specific procedure of a print setting process of the MFP 1 will be described with reference to the flowchart in FIG. 3. When the MFP 1 is turned on by a user, the CPU 24 reads a print setting process program from the program ROM 28 and executes it, thereby starting a print setting process procedure RT1 and proceeds to step SP1.

In step SP1, the CPU 24 controls the power source controller 56 to supply power from the power source 58 to each component in the MFP 1, then proceeding to step SP2. In step SP2, the CPU 24 performs initial setting of peripheral large scale integrations (LSIs) in the MFP 1 and initial setting such as initialization of memories in the MFP 1. At this time, the CPU 24 performs print preparation control of the printer engine 54 via the printer engine interface 52, performs original reading preparation control of the scanner unit 50 via the scanner interface 48, and enables the host interface 42 to communicate with a host devices 60.

After the initial setting, the CPU 24 proceeds to step SP3, and periodically performs detection of a wireless LAN radio wave generated by a host device 60 by using the host interface 42 and determines whether a wireless LAN radio wave has been detected. The CPU 24 waits until it detects a wireless LAN radio wave. If the CPU 24 makes a positive determination in step SP3, it proceeds to step SP4. This positive determination indicates that a user who may use the MFP 1 now has approached the MFP 1.

In step SP4, the CPU 24 analyzes data (a header and data in a data packet) in the detected wireless LAN radio wave and extracts from the data a user identification information item IUID (host name IHT, IP address IIP, MAC address IMAC, etc.). The CPU 24 then compares the user identification information item (referred to as the obtained user identification information item) obtained from the host device 60 with the one or more user identification information items (referred to as the registered user identification information items) previously stored in the setting storage memory 32, and determines whether the obtained user identification information item matches one of the registered user identification information items. If a positive determination is made in this step, the CPU 24 proceeds to step SP5.

This positive determination indicates that a user carrying a host device 60 previously registered with the setting storage memory 32 exists within the range (referred to as the radio wave detectable range) in which the host device 60 is near enough for the MFP 1 to detect a wireless LAN radio wave from the host device 60. On the other hand, if a negative determination is made in step SP4, the CPU 24 returns to step SP3 and waits for detection of a wireless LAN radio wave. This negative determination indicates that a wireless LAN radio wave has been detected but the device generating the radio wave is not previously registered with the setting storage memory 32.

In step SP5, the CPU 24 obtains the intensity of the radio wave from the host device 60 via the host interface 42, then proceeding to step SP6. In step SP6, the CPU 24 determines whether the obtained intensity of the radio wave is equal to or greater than a threshold. This threshold is set so that, when a user approaches the MFP 1 close enough to be considered to be likely to use the MFP 1 now (or when a user is near the MFP), the intensity of a wireless LAN radio wave emitted by a host device 60 carried by the user is equal to or greater than the threshold. If a positive determination is made in this step, the CPU 24 proceeds to step SP7. This positive determination indicates that a user carrying a host device 60 previously registered with the setting storage memory 32 exists near the MFP 1. On the other hand, if a negative determination is made in step SP6, the CPU 24 returns to step SP3 and waits for detection of a wireless LAN radio wave. This negative determination indicates that a wireless LAN radio wave generated by a host device 60 previously registered with the setting storage memory 32 has been detected but the user carrying the host device 60 is not near the MFP 1. Hereinafter, a host device 60 that has been previously registered with the setting storage memory 32 and whose radio wave has been detected at an intensity equal to or greater than the threshold (or a host device 60 pertaining to the positive determination in step SP6) will be also referred to as a neighboring device.

In step SP7, the CPU 24 determines whether multiple neighboring devices have been detected. If a positive determination is made in this step, the CPU 24 proceeds to step SP8. This positive determination indicates that multiple neighboring devices have been detected and thus it is necessary to select one of the multiple neighboring devices as a selected neighboring device. In step SP8, the CPU 24 selects the neighboring device having the highest radio wave intensity from among the multiple neighboring devices as a selected neighboring device then proceeding to step SP9. On the other hand, if a negative determination is made in step SP7, the CPU 24 determines the detected neighboring device as a selected neighboring device, then skipping step SP8 and proceeding to step SP9. This negative determination indicates that only one neighboring device has been detected.

In step SP9, the CPU 24 measures time using the timer 26 and determines whether the intensity of the radio wave received from the selected neighboring device remains (or continues to be) equal to or greater than the threshold for a predetermined time period (e.g., several seconds). If a positive determination is made in this step, the CPU 24 determines the selected neighboring device as a determined neighboring device, then proceeding to step SP10. This positive determination indicates that the user carrying the selected neighboring device is extremely likely to use the MFP 1 now. On the other hand, if a negative determination is made in step SP9, the CPU 24 returns to step SP3 and waits for detection of a wireless LAN radio wave. This negative determination indicates that the selected neighboring device has been selected but the user carrying the selected neighboring device has left the vicinity of the MFP 1.

In step SP10, the CPU 24 reads, from the setting storage memory 32, the mode information item ISM corresponding to the user identification information item IUID corresponding to the determined neighboring device, and sets the MFP 1 to the mode corresponding to the read mode information item ISM (or configures settings for the MFP 1 based on the read mode information item ISM), then proceeding to step SP11 and ends the print setting process procedure RT1.

<1-3. Operation and Advantages>

With this embodiment, it is possible to configure various settings for the MFP 1 depending on the distance from the MFP 1 to a user without operation by the user, thereby improving functionality and user-friendliness.

The MFP 1 having the above configuration detects the intensity of a radio wave from a host device 60 previously registered with the MFP 1; if the detected radio wave intensity remains equal to or greater than the threshold for the predetermined time period, the MFP 1 determines that a user carrying the host device 60 has approached the MFP 1 in order to use the MFP 1, and sets the MFP 1 to the mode (or operating mode) corresponding to the host device 60. Thereby, the MFP 1 automatically switches to functions and settings that are usually used by the user about to use the MFP 1. This can save user's time and improve user-friendliness.

An MFP may include a card reader for communicating with a non-contact IC card, and when the non-contact IC card is brought close to the card reader by a user, read data from the non-contact IC card by the card reader and identify the user based on the read data. However, this MFP includes the card reader, and thus has a complicated structure. Further, the MFP cannot identify a user unless the user approaches the MFP and brings the non-contact IC card close to the card reader. Thus, the user needs to carry the non-contact IC card and perform the troublesome operation.

In contrast, the MFP 1 according to this embodiment receives a radio wave emitted from a host device 60 carried by a user on a daily basis; when a user approaches the MFP 1, the MFP 1 identifies the user; before the user reaches a position where the user can operate the MFP 1, the MFP 1 is set to the mode corresponding to the user. Thus, the user need neither operate the MFP 1 nor carry a non-contact IC card in order to allow the MFP 1 to identify the user. This improves user-friendliness.

There is a conventional MFP having a host interface for communicating with a host device. The MFP 1 detects the intensity of a wireless LAN radio wave from a host device 60 by using the host interface 42, which may be the same as the host interface of the conventional MFP. Thus, with respect to the conventional MFP, the MFP 1 needs no additional equipment or component and requires no structural change, reducing additional cost.

An MFP may detect a user approaching the MFP by using a human sensor (e.g., infrared sensor). However, although this MFP can detect a person approaching the MFP, it cannot identify who the person is. Thus, the MFP cannot set itself to the mode corresponding to the person. Further, when multiple users exist within a range in which a user can operate the MFP, the MFP cannot determine which of the multiple users the MFP should set itself to the mode corresponding to.

On the other hand, the MFP 1 obtains, from a host device 60, the user identification information item IUID unique to the host device 60 via wireless communication. Thereby, the MFP 1 can identify a user about to use the MFP 1. Further, the MFP 1 is more simple in structure than the MFP with the human sensor.

Further, when the MFP 1 detects multiple neighboring devices, it selects the neighboring device having the highest radio wave intensity from among the multiple neighboring devices, as the selected neighboring device. Thus, the MFP 1 can set itself to the mode corresponding to the user closest to the MFP 1. Thereby, if multiple users each carrying a neighboring device exist near the MFP 1, the MFP 1 can set itself to the mode corresponding to the user most likely to use the MFP 1 now.

Further, when the intensity of a radio wave received from the selected neighboring device remains equal to or greater than the threshold for the predetermined time period, the MFP 1 determines the selected neighboring device as the determined neighboring device. This can prevent the MFP 1 from being set to an inappropriate mode. Specifically, when the user carrying the selected neighboring device has left the vicinity of the MFP 1, the MFP 1 can prevent itself from being set to the mode corresponding to the user, who is unlikely to use the MFP 1 now.

The above-described MFP 1 includes: the memory 12 configured to store a user identification information item IUID as identification information identifying a host device 60 and a mode information item ISM as mode information (or setting mode information) indicating a mode corresponding to the host device 60 in association with each other; the communication unit 16 configured to receive from the host device 60 a wireless signal including a user identification information item IUID that is stored in the host device 60 and identifies the host device 60, and determine an intensity of the received wireless signal; and the controller 10 configured to, when determining that the determined intensity of the received wireless signal is equal to or greater than the predetermined intensity (i.e., the threshold that is an intensity at which the host device 60 is determined to be near the MFP 1), read from the memory 12 the mode information item ISM corresponding to the user identification information item IUID included in the wireless signal received from the host device 60, and set the MFP 1 to the mode indicated by the read mode information item ISM (or configure the MFP 1 based on the read mode information). Thereby, before a user enters the range in which the user can operate the MFP 1, the MFP 1 can set itself to the mode corresponding to the user without operation by the user.

<2. Second Embodiment>
<2-1. Configuration of MFP>

Figure 4:
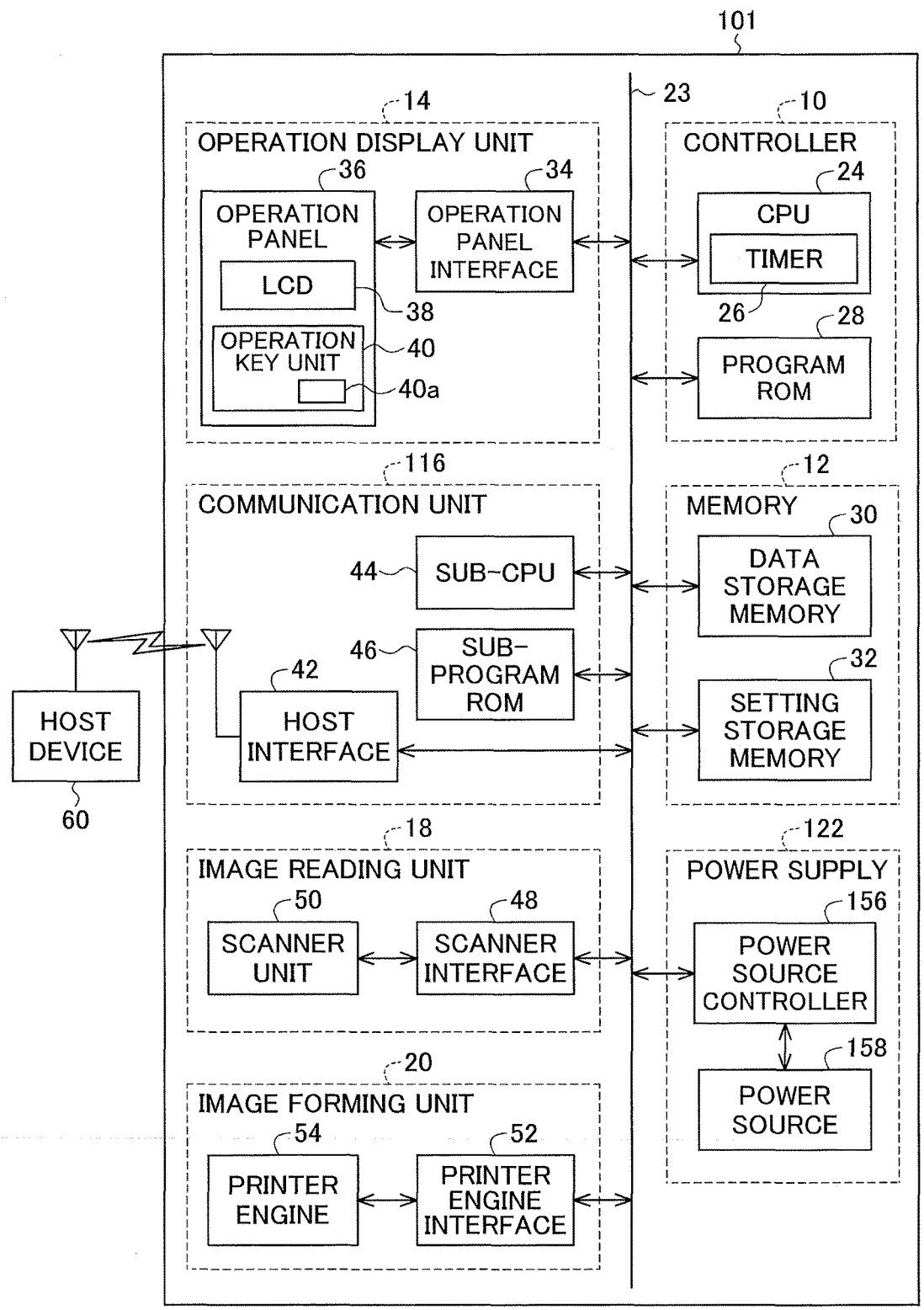
FIG. 4 is a block diagram illustrating a functional configuration of a printer according to a second embodiment.

FIG. 4 illustrates an MFP 101 according to a second embodiment. In FIG. 4, parts corresponding to those in FIG. 1 are indicated by the same reference characters. As illustrated in FIG. 4, the MFP 101 differs from the MFP 1 of the first embodiment in having a power supply 122 instead of the power supply 22 and a communication unit 116 instead of the communication unit 16, but otherwise is the same.

The power supply 122 differs from the power supply 22 in having a power source controller 156 instead of the power source controller 56 and a power source 158 instead of the power source 58. The power source 158 has power supply modes: a normal power mode in which it supplies predetermined power to the controller 10, memory 12, operation display unit 14, communication unit 116, image reading unit 18, and image forming unit 20; and a power saving mode in which it supplies power only to the operation display unit 14 and communication unit 116 and interrupts power supply to the controller 10, memory 12, image reading unit 18, and image forming unit 20. The power source 158 is switched to either the normal power mode or the power saving mode under control of the power source controller 156. When the MFP 101 is in the power saving mode, only the operation display unit 14 and communication unit 116 operate. Thus, although the function of the MFP 101 is limited to only receiving user's operation and receiving wireless LAN radio waves, it is possible to reduce the power consumption of the entire MFP 101 and save power, as compared to when the MFP 101 is in the normal power mode.

The communication unit 116 differs from the communication unit 16 in having a sub-CPU 44 and a sub-program ROM 46, but otherwise is the same. In the normal power mode, the sub-CPU 44 reads a predetermined program from the program ROM 28 and executes it, thereby controlling the printer engine 54 (specifically, motors, various sensors, and other components in the printer engine 54) via the printer engine interface 52. On the other hand, in the power saving mode, the sub-CPU 44 reads a predetermined program from the sub-program ROM 46 and executes it, thereby controlling the host interface 42 and communicating with a host device 60 via the host interface 42. As such, the sub-CPU 44 controls the printer engine 54 in the normal power mode and controls the host interface 42 in the power saving mode. The sub-CPU 44 is lower in power consumption than the CPU 24. The power saving mode can make the power consumption of the MFP 101 minimum. The CPU 24 or sub-CPU 44 gives an instruction to the power source controller 156, which controls the power source 58 to switch between the power supply modes in accordance with the instruction.

The operation key unit 40 in the operation display unit 14 includes a power saving key 40a. The power saving key 40a is for instructing to return from the power saving mode to the normal power mode, and operable by a user. The CPU 24 and sub-CPU 44 receive operations or instructions from the operation key unit 40 via the operation panel interface 34 and thereby detect that the power saving key 40a has been operated.

<2-2. Print Process Procedure>

Figure 5:
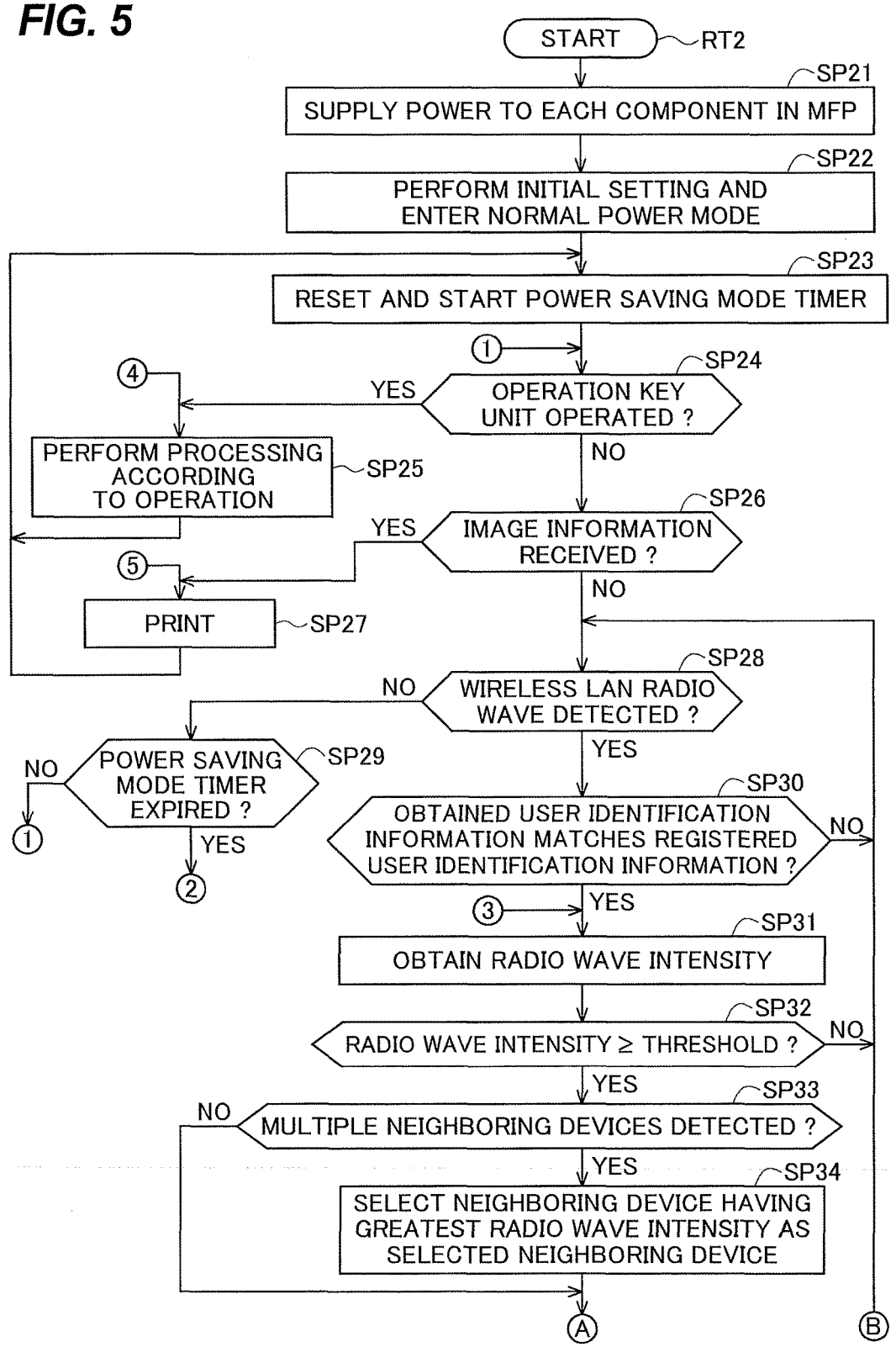

Next, a specific procedure of a print process of MFP 101 will be described with reference to the flowchart in FIGS. 5 and 6. When the MFP 101 is turned on by a user, the CPU 24 reads a print process program from the program ROM 28 and executes it, thereby starting a print process procedure RT2 and proceeds to step SP21. Hereinafter, processes in the print process procedure RT2 different from those in the print setting process procedure RT1 (FIG. 3) will be mainly described.

Figure 3:
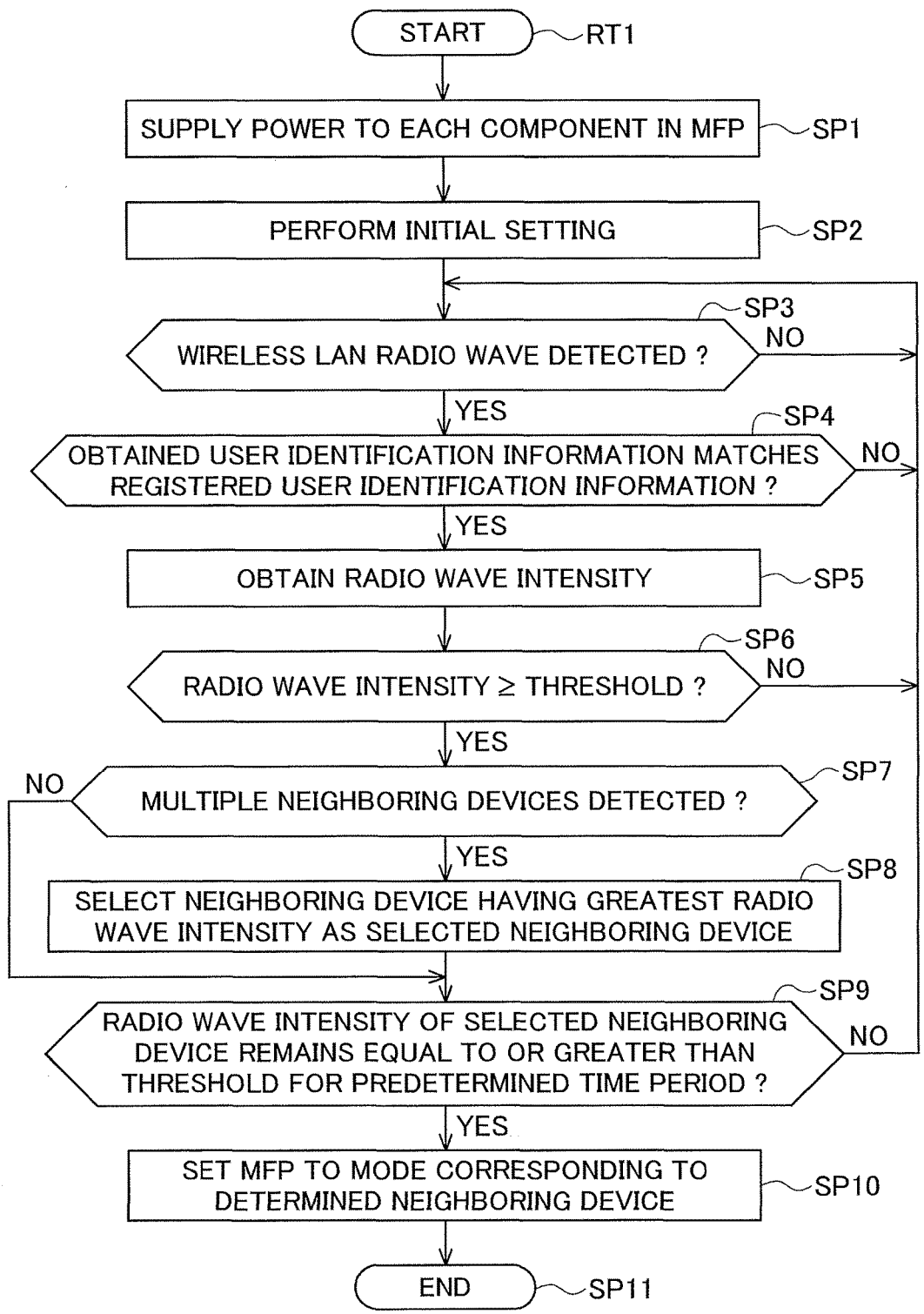
FIG. 3 is a flowchart illustrating a print setting process procedure.

In steps SP21 and SP22, the CPU 24 supplies power from the power source 158 to each component in the MFP 101 and performs initial setting of peripheral LSIs in.the MFP 101 and initial setting such as initialization Of memories in the MFP 101, as in step SP1 and SP2 of FIG. 3. At this time, the sub-CPU 44 performs print preparation control via the printer engine interface 52, and then the CPU 24 enables communication with host devices via the host interface 42, entering a wait state. At this time, the MFP 101 is in the normal power mode.

After the initial setting, the CPU 24 proceeds to step SP23, and causes the timer 26 to reset and start a power saving mode timer, then proceeding to step SP24. The power saving mode timer measures a predetermined time period (referred to as the power saving mode shift time period). After the power saving mode timer is started, when the power saving mode shift time period elapses without the power saving mode timer being reset, the power saving mode timer expires (or times out). The time period (i.e., power saving mode shift time period) of the power saving mode timer is, for example, from 1 minute to about 2 hours.

In step SP 24, the CPU 24 determines whether the operation key unit 40 has been operated by a user. If a positive determination is made in this step, the CPU 24 proceeds to step SP25 and performs processing (e.g., copying or scanning) in accordance with the operation. The CPU 24 then returns to step SP23 and causes the timer 26 to reset and start the power saving mode timer. On the other hand, if a negative determination is made in step. SP24, the CPU 24 proceeds to step SP26.

In step SP26, the CPU 24 waits for reception of image information (or a print job) via the host interface 42 and determines whether it has received image information to be printed. If a positive determination is made in this step, the CPU 24 proceeds to step SP27. In step SP27, the CPU 24 transfers the received image information to the printer engine 54 via the printer engine interface 52 and controls the printer engine 54 to print the image information. The CPU 24 then returns to step SP23 and causes the timer 26 to reset and start the power saving mode timer. On the other hand, if a negative determination is made in step SP26, the CPU 24 proceeds to step SP28.

In step SP28, the CPU 24 performs detection of a wireless LAN radio wave by using the host interface 42 and determines whether a wireless LAN radio wave has been detected, as in step SP3 of FIG. 3. If a positive determination is made in step SP28, the CPU 24 proceeds to step SP30. This positive determination indicates that a user who may use the MFP 101 now has approached the MFP 101. On the other hand, if a negative determination is made in step SP28, the CPU 24 proceeds to step SP29.

In step SP29, the CPU 24 checks the power saving mode timer to determine whether the power saving mode timer has expired. If a positive determination is made in this step, the CPU 24 proceeds to step SP39. This positive determination indicates that the MFP 101 should shift to the power saving mode since the power saving mode timer has expired. On the other hand, if a negative determination is made in step SP29, the CPU 24 returns to step SP24 and waits for an user's operation or instruction. This negative determination indicates that the MFP 101 should remain in the normal power mode without shifting to the power saving mode since the power saving mode timer has not expired.

In steps SP30 to SP36, the CPU 24 performs the same processes as those in steps SP4 to SP10 of FIG. 3, then proceeding to step SP37.

In step SP 37, the CPU 24 measures time using the timer 26 and determines whether the intensity of the radio wave received from the determined neighboring device remains (or continues to be) less than the threshold for a predetermined time period. If a positive determination is made in this step, the CPU 24 proceeds to step SP38. This positive determination indicates that the user carrying the determined neighboring device has left the vicinity of the MFP 101. On the other hand, if a negative determination is made in step SP37, the CPU 24 returns to step SP28 and waits for detection of a wireless LAN radio wave. This negative determination indicates that the user carrying the determined neighboring device is still in the vicinity of the MFP 101.

In step SP38, the CPU 24 determines whether there is at least one neighboring device other than the determined neighboring device that has left the vicinity of the MFP 101. If a positive determination is made in this step, the CPU 24 returns to step SP31. This positive determination indicates that the user carrying the determined neighboring device has left the vicinity of the MFP 101 but there is another neighboring device, and thus the MFP 101 need not shift to the power saving mode. On the other hand, if a negative determination is made in step SP38, the CPU 24 proceeds to step SP39. This negative determination indicates that the user carrying the determined neighboring device has left the vicinity of the MFP 101 and there is no neighboring device, and thus the MFP 101 needs to shift to the power saving mode.

In step SP39, the CPU 24 shifts the MFP 101 to the power saving mode, then proceeding to step SP40. Specifically, the CPU 24 sets the sub-CPU 44 to perform initialization according to a program stored in the sub-program ROM 46, stops control of the host interface 42, and resets the sub-CPU 44. Then, the sub-CPU 44 boots up according to the program stored in the sub-program ROM 46, and starts to control the host interface 42. Then, the sub-CPU 44 controls the power source controller 156 to supply power to only the communication unit 116 and operation display unit 14 and interrupts power supply to the other components, including the controller 10, memory 12, image reading unit 18, and image forming unit 20.

In step SP40, the sub-CPU 44 waits until the operation key unit 40 is operated, until a wireless LAN radio wave is detected, or until image information is received. In this manner, once the MFP 101 shifts from the normal power mode to the power saving mode, it remains in the power saving mode until a wireless LAN radio wave is detected, until image information is received, or until the operation key unit 40 is operated. Thereby, although the function of the MFP 101 is limited, it is possible to reduce the power consumption of the entire MFP 101 and save power, as compared to the normal power mode. On the other hand, in step SP40, if the operation key unit 40 is operated, if a wireless LAN radio wave is detected, or if image information is received, the sub-CPU 44 proceeds to step SP41.

In step SP41, the sub-CPU 44 shifts the MFP 101 to the normal power mode, then proceeding to step SP42. Specifically, the sub-CPU 44 controls the power source controller 156 to supply power to each component in the MFP 101. This increases the power consumption of the MFP 101, as compared to the power saving mode. Then, the CPU 24 boots up, and initializes the controller 10. When the CPU 24 reaches a state in which it can perform processing, the CPU 24 communicates with the sub-CPU 44 and takes over data processing for the host interface 42 from the sub-CPU 44. After the CPU 24 has taken over the processing from the sub-CPU 44, it sets the sub-CPU 44 to perform initialization according to a program stored in the program ROM 28 and resets the sub-CPU 44. Then, the sub-CPU 44 boots up according to the program stored in the program ROM 28, and starts print preparation control of the printer engine 54 via the printer engine interface 52.

In step SP42, the CPU 24 determines whether the operation key unit 40 has been operated by a user. If a positive determination is made in this step, the CPU 24 proceeds to step SP25, performs processing in accordance with the operation, returns to step SP23, and causes the timer 26 to reset and start the power saving mode timer. On the other hand, if a negative determination is made in step SP42, the CPU 24 proceeds to step SP43.

In step SP43, the CPU 24 waits for reception of image information via the host interface 42 and determines whether it has received image information to be printed. If a positive determination is made in this step, the CPU 24 proceeds to step SP27. In step SP27, the CPU 24 transfers the received image information to the printer engine 54 via the printer engine interface 52 and controls the printer engine 54 to print the image information, then returning to step SP23 and causing the timer 26 to reset and start the power saving mode timer. On the other hand, if a negative determination is made in step SP43, the CPU 24 returns to step SP28 and waits for detection of a wireless LAN radio wave.

<2-3. Operation and Advantages>

The MFP 101 having the above configuration detects the intensity of a radio wave from a host device 60 previously registered with the MFP 101; if the detected radio wave intensity remains less than the threshold for the predetermined time period, the MFP 101 determines that a user carrying the host device 60 has finished using the MFP 101 and left the MFP 101, and shifts from the normal power mode to the power saving mode. Thus, when the MFP 101 is put into a state in which it is not used immediately, the MFP 101 can automatically shift to the power saving mode, thereby reducing the power consumption, as compared to a case where it remains in the normal power mode.

Further, in the power saving mode, the MFP 101 keeps the communication unit 116 and operation display unit 14 enabled, and thereby can receive a user's operation, a wireless LAN radio wave, and image information. Thus, upon receiving a user's operation, a wireless LAN radio wave, or image information, the MFP 101 can promptly return from the power saving mode to the normal power mode.

An MFP may use a human sensor (e.g., infrared sensor) to detect that a user has left the MFP. However, this configuration can detect that a user has left the MFP, but when multiple users are near the MFP and only one of them has left the MFP, it cannot identify who has left the MFP.

On the other hand, the MFP 101 obtains, from host devices 60, the user identification information items IUID unique to the host devices 60 via wireless communication. Thereby, when multiple users are near the MFP 101 and only one of them has left the MFP 101, the MFP 101 can determine whether another user carrying another neighboring device exists near the MFP 101, and if it is determined that another user exists, promptly set the MFP 101 to the mode corresponding to the other user, thereby improving user-friendliness. As such, since the MFP 101 individually detects host devices 60 each having a unique user identification information item IUID, even when multiple users approach or leave the MFP 101, the MFP 101 can individually detect the users and set itself to the modes corresponding to the users. Further, the MFP 101 is more simple in structure than the MFP having the human sensor.

The above-described MFP 101 includes: the power supply 122 configured to switch between the normal power mode in which it supplies power to each of the components in the MFP 101 and the power saving mode in which it supplies power to a subset of the components in the MFP 101; and the CPU 24 and sub-CPU 44 as a power mode switching unit (or power mode switcher) configured to, when determining that an intensity of a radio wave is less than the threshold, switch the power supply 122 from the normal power mode to the power saving mode. With this configuration, when the MFP 101 is put into a state in which it is not used immediately, the MFP 101 can automatically shift to the power saving mode without user's operation, thereby reducing the power consumption.

In addition, the MFP 101 according to the second embodiment provides substantially the same advantages as those of the MFP 1 according to the first embodiment.

<3. Modifications>

In each of the above embodiments, when the intensity of the radio wave received from the selected neighboring device remains equal to or greater than the threshold for the predetermined time period, the MFP determines the selected neighboring device as the determined neighboring device. However, the present invention is not limited to this. The MFP may determine the selected neighboring device as the determined neighboring device without determining whether the intensity of the radio wave remains equal to or greater than the threshold for the predetermined time period.

When the MFP detects radio waves from multiple host devices, it may obtain, for each of the multiple host devices, an integrated value of the intensity of the radio wave from the beginning of detection of the radio wave (or the amount of change in intensity of the radio wave), and determine the host device having the greatest integrated value (or the greatest amount of change) of the multiple host devices as the determined neighboring device. In this case, there is no need to determine whether the intensity of the radio wave is equal to or greater than the threshold.

When the MFP detects multiple neighboring devices whose radio wave intensities are the same and remain equal to or greater than the threshold for the predetermined time period, the MFP may determine, as the determined neighboring device, the host device whose radio wave intensity was the first to reach the threshold among the radio wave intensities, or the host devide carried by the user who was the last to use the MFP among the users of the multiple neighboring devices. In this manner, the MFP may determine the determined neighboring device based on past radio wave intensities in addition to the current radio wave intensities. Further, when the MFP detects multiple neighboring devices whose radio wave intensities are the same and remain equal to or greater than the threshold for the predetermined time period, the MFP may allow a user to operate the operation display unit 14 to select a user using the MFP now.

When a user who will perform monochrome printing and another user who will perform color printing exist near the MFP, the MFP may configure functions common to both the monochrome printing and the color printing before determining the determined neighboring device, and configure functions different between the monochrome printing and the color printing after determining the determined neighboring device.

Further, in each of the above embodiments, the MFP compares a user identification information item obtained from the host device 60 with the one or more registered user identification information items previously stored in the setting storage memory 32, and if the obtained user identification information item matches one of the registered user identification information items, reads the mode information item ISM corresponding to the user identification information item IUID corresponding to the determined neighboring device, and sets the MFP to the mode corresponding to the read mode information item ISM. However, the present invention is not limited to this, and the MFP may be configured as follows. The MFP previously stores no user identification information item IUID and mode information item ISM in the setting storage memory 32. Based on wireless LAN radio waves received from host devices carried by users using the MFP, for each user, the MFP learns settings frequently used by the user and stores the user identification information item IUID of the user and a mode information item ISM indicating the learned settings in the setting storage memory 32 in association with each other.

In the above second embodiment, when the determined neighboring device has left the vicinity of the MFP 101, if another neighboring device exists, the MFP 101 remains in the normal power mode. However, the present invention is not limited to this, and the MFP 101 may be configured as follows. When the determined neighboring device has left the vicinity of the MFP 101, if the MFP 101 can detect a wireless LAN radio wave from another host device 60, whether or not the other host device 60 is a neighboring device, the MFP 101 remains in the normal power mode.

In the above second embodiment, when the intensity of the radio wave received from the determined neighboring device remains less than the threshold for the predetermined time period, the MFP 101 shifts to the power saving mode. However, the present invention is not limited to this, and the MFP 101 may be configured as follows. When the intensity of the radio wave received from the determined neighboring device becomes less than the threshold, the MFP 101 shifts to the power saving mode without determining whether the intensity of the radio wave received from the determined neighboring device remains less than the threshold for the predetermined time period.

In each of the above embodiments, the MFP detects a host device 60 by receiving a wireless LAN radio wave from the host device 60. However, the present invention is not limited to this, and the MFP may use another communication method, such as infrared communication, in which a host device emits a wireless signal from which the host device can be identified.

In the above second embodiment, in each of steps SP28 and SP40 of the print process procedure RT2 (FIG. 6), the MFP 101 may use a threshold to determine whether a wireless LAN radio wave has been detected. The thresholds in steps SP28 and SP40 may be different.

In the above second embodiment, the MFP 101 keeps the operation display unit 14 and communication unit 116 enabled in the power saving mode. However, the present invention is not limited to this, and the MFP 101 may supply no power to the operation display unit 14 in the power saving mode. Even in this case, when the communication unit 116 receives a wireless LAN radio wave in the power saving mode, the MFP 101 can shift to the normal power mode.

In each of the above embodiments, the MFP stores, in the setting storage memory 32, apparatus setting information IMS set by operation of the operation display unit 14 by a user. However, the present invention is not limited to this, and the MFP may store, in the setting storage memory 32, apparatus setting information IMS externally received via, for example, the communication unit 16.

In the above second embodiment, the MFP 101 switches between the normal power mode and the power saving mode depending on the intensity of a wireless LAN radio wave received from a host device 60. However, the present invention is not limited to this. The MFP 101 may have two or more arbitrary modes and switch between these modes depending on the intensity of a radio wave. In each of the above embodiments, the user identification information item IUID consists of a user number IID, a host name IHT, an IP address IIP, and a MAC address IMAC. However, the present invention is not limited to this. The user identification information item IUID may be any information item that is capable of individually identifying a host device 60 carried by a user and is unique to the host device 60.

The present invention is not limited to the above, embodiments and modifications. The present invention also covers all possible combinations or subsets of features of the above embodiments and modifications.

In each of the above embodiments, the present invention is applied to the electrophotographic MFP. However, the present invention is not limited to this, and is applicable to various types of apparatuses, such as copiers or facsimile machines, that externally receive print data, scan image data, or other data and form images in accordance with the received data.

In the above embodiments, the MFP 1 or 101 as an image forming apparatus includes the memory 12 as a storage unit, the communication unit 16 or 116 as a communication unit, and the controller 10 as a control unit. However, the present invention is not limited to this, and various types of storage units, communication units, and control units may be used to configure an image forming apparatus.

The present invention is also applicable to various types of electronic devices, such as a computer that causes a printer to print an image, an image scanner, a facsimile machine, or a copier, that perform various types of processes regarding images.

What is claimed is:

1. An image forming apparatus comprising:
   a memory configured to store identification information identifying an information terminal device and mode information indicating a mode corresponding to the information terminal device in association with each other;
   a communication interface configured to receive from the information terminal device a wireless signal including identification information that is stored in the information terminal device and identifies the information terminal device, and determine an intensity of the received wireless signal; and
   a controller configured to, when determining that the determined intensity of the received wireless signal remains equal to or greater than a predetermined intensity for a predetermined time period, read from the memory the mode information corresponding to the identification information included in the received wireless signal, and set the image forming apparatus to the mode indicated by the read mode information.

2. The image forming apparatus of claim 1, wherein:
   the information terminal device is one of a plurality of information terminal devices;
   the memory is configured to, for each of the plurality of information terminal devices, store identification information identifying the information terminal device and mode information indicating a mode corresponding to the information terminal device in association with each other;
   the communication interface is configured to, for each of the plurality of information terminal devices, receive from the information terminal device a wireless signal including identification information that is stored in the information terminal device and identifies the information terminal device, and determine an intensity of the received wireless signal; and
   the controller is configured to, when determining that the communication interface receives from the plurality of information terminal devices wireless signals having intensities equal to or greater than the predetermined intensity, read from the memory the mode information corresponding to the identification information included in a wireless signal having a highest intensity of the wireless signals, and set the image forming apparatus to the mode indicated by the read mode information.

3. The image forming apparatus of claim 1, wherein:
   the information terminal device is one of a plurality of information terminal devices;

the memory is configured to, for each of the plurality of information terminal devices, store identification information identifying the information terminal device and mode information indicating a mode corresponding to the information terminal device in association with each other;

the communication interface is configured to, for each of the plurality of information terminal devices, receive from the information terminal device a wireless signal including identification information that is stored in the information terminal device and identifies the information terminal device, and determine an intensity of the received wireless signal; and the controller is configured to, when determining that the communication interface receives from the plurality of information terminal devices wireless signals having intensities equal to or greater than the predetermined intensity, select one of the plurality of information terminal devices based on current intensities and past intensities of wireless signals from the plurality of information terminal devices, and set the image forming apparatus to the mode indicated by the mode information corresponding to the identification information of the selected information terminal device.

4. The image forming apparatus of claim 1, further comprising a user interface configured to receive an operation from a user for storing the identification information and the mode information in the memory.

5. The image forming apparatus of claim 1, further comprising a printing device configured to print, on a medium, image information to be printed that is externally received by the communication interface.

6. The image forming apparatus of claim 1, wherein the wireless signal is a radio wave, and the intensity is an intensity of the radio wave.

7. The image forming apparatus of claim 1, further comprising:

a power supply configured to switch between a normal power mode in which the power supply supplies power to each of a plurality of components in the image forming apparatus and a power saving mode in which the power supply supplies power to a subset of the plurality of components in the image forming apparatus; and a switcher configured to, when determining that the determined intensity is less than the predetermined intensity, switch the power supply from the normal power mode to the power saving mode.

8. The image forming apparatus of claim 7, wherein:
the plurality of components include the communication interface and the switcher; and
the power supply supplies power to at least the communication interface and the switcher in the power saving mode.

9. The image forming apparatus of claim 8, further comprising a user interface configured to receive an operation from a user, wherein:
the plurality of components further include the user interface; and
the power supply supplies power to at least the communication interface, the switcher, and the user interface in the power saving mode.

10. The image forming apparatus of claim 9, wherein the switcher is configured to, when the user interface detects an operation from a user, switch the power supply from the power saving mode to the normal power mode.

11. The image forming apparatus of claim 8, wherein the switcher is configured to, when the communication interface detects the wireless signal, switch the power supply from the power saving mode to the normal power mode.

12. The image forming apparatus of claim 8, wherein:
the communication interface is configured to externally receive image information to be printed; and
the switcher is configured to, when the communication interface receives image information to be printed, switch the power supply from the power saving mode to the normal power mode.

13. The image forming apparatus of claim 7, wherein the switcher is configured to, when determining that the determined intensity remains less than the predetermined intensity for a predetermined time period, switch the power supply from the normal power mode to the power saving mode.

14. The image forming apparatus of claim 7, wherein:
the information terminal device is one of a plurality of information terminal devices;
the memory is configured to, for each of the plurality of information terminal devices, store identification information identifying the information terminal device and mode information indicating a mode corresponding to the information terminal device in association with each other;
the communication interface is configured to, for each of the plurality of information terminal devices, receive from the information terminal device a wireless signal including identification information that is stored in the information terminal device and identifies the information terminal device, and determine an intensity of the received wireless signal; and
the controller is configured to, when the controller determines that the determined intensity of a wireless signal from one of the plurality of information terminal devices is less than the predetermined intensity, if the communication interface receives a wireless signal having an intensity equal to or greater than the predetermined intensity from another of the plurality of information terminal devices, set the image forming apparatus to the mode indicated by the mode information corresponding to the other information terminal device.

15. The image forming apparatus of claim 1, wherein the predetermined intensity is an intensity at which the information terminal device is determined to be near the image forming apparatus.

16. The image forming apparatus of claim 1, wherein:
the information terminal device is one of a plurality of information terminal devices;
the memory is configured to, for each of the plurality of information terminal devices, store identification information identifying the information terminal device and mode information indicating a mode corresponding to the information terminal device in association with each other;
the communication interface is configured to, for each of the plurality of information terminal devices, receive from the information terminal device a wireless signal including identification information that is stored in the information terminal device and identifies the information terminal device, and determine an intensity of the received wireless signal; and
the controller is configured to:
when determining that the communication interface receives from the plurality of information terminal devices wireless signals having intensities equal to or greater than the predetermined intensity, read from the memory the mode information corresponding to the plurality of information terminal devices; and when there are one or more functions common to the modes indicated by the read mode information corresponding to the plurality of information terminal devices, configure the one or more common functions, and then determine one of the plurality of information terminal devices and configure one or more functions of the mode indicated by the read mode information corresponding to the determined information terminal device, except for the one or more common functions.

17. A method for setting an apparatus, comprising:

receiving, by a communication interface, from an information terminal device, a wireless signal including identification information that is stored in the information terminal device and identifies the information terminal device;

determining, by a signal intensity determiner, an intensity of the wireless signal received from the information terminal device;

determining, by a determiner, whether the determined intensity of the received wireless signal is equal to or greater than a predetermined intensity; and when it is determined that the determined intensity of the received wireless signal remains equal to or greater than the predetermined intensity for a predetermined time period, reading mode information corresponding to the identification information included in the received wireless signal and indicating a mode corresponding to the information terminal device, from a memory storing the identification information and the mode information in association with each other, and setting, by a setter, the apparatus to the mode indicated by the read mode information.

18. The method of claim 17, wherein:

the information terminal device is one of a plurality of information terminal devices;

the memory is configured to, for each of the plurality of information terminal devices, store identification information identifying the information terminal device and mode information indicating a mode corresponding to the information terminal device in association with each other;

the receiving receives, for each of the plurality of information terminal devices, a wireless signal including identification information that is stored in the information terminal device and identifies the information terminal device from the information terminal device;

the first determining determines, for each of the plurality of information terminal devices, an intensity of the wireless signal received from the information terminal device;

the second determining determines, for each of the plurality of information terminal devices, whether the determined intensity of the received wireless signal is equal to or greater than a predetermined intensity; and the method further comprises:

when it is determined that the receiving receives from the plurality of information terminal devices wireless signals having intensities equal to or greater than the predetermined intensity, reading from the memory the mode information corresponding to the plurality of information terminal devices; and when there are one or more functions common to the modes indicated by the read mode information corresponding to the plurality of information terminal devices, configuring the one or more common functions, and then determining one of the plurality of information terminal devices and configuring one or more functions of the mode indicated by the read mode information corresponding to the determined information terminal device, except for the one or more common functions.

19. A non-transitory computer-readable medium storing a program causing a computer to execute a process for setting an apparatus, the process comprising:

receiving from an information terminal device a wireless signal including identification information that is stored in the information terminal device and identifies the information terminal device;

determining an intensity of the wireless signal received from the information terminal device;

determining whether the determined intensity of the received wireless signal is equal to or greater than a predetermined intensity; and when it is determined that the determined intensity of the received wireless signal remains equal to or greater than the predetermined intensity for a predetermined time period, reading mode information corresponding to the identification information included in the received wireless signal and indicating a mode corresponding to the information terminal device, from a memory storing the identification information and the mode information in association with each other, and setting the apparatus to the mode indicated by the read mode information.

20. The non-transitory computer-readable medium of claim 19, wherein:

the information terminal device is one of a plurality of information terminal devices;

the memory is configured to, for each of the plurality of information terminal devices, store identification information identifying the information terminal device and mode information indicating a mode corresponding to the information terminal device in association with each other;

the receiving receives, for each of the plurality of information terminal devices, a wireless signal including identification information that is stored in the information terminal device and identifies the information terminal device from the information terminal device;

the first determining determines, for each of the plurality of information terminal devices, an intensity of the wireless signal received from the information terminal device;

the second determining determines, for each of the plurality of information terminal devices, whether the determined intensity of the received wireless signal is equal to or greater than a predetermined intensity; and the process further comprises:

when it is determined that the receiving receives from the plurality of information terminal devices wireless signals having intensities equal to or greater than the predetermined intensity, reading from the memory the mode information corresponding to the plurality of information terminal devices; and when there are one or more functions common to the modes indicated by the read mode information corresponding to the plurality of information terminal devices, configuring the one or more common functions, and then determining one of the plurality of information terminal devices and configuring one or more functions of the mode indicated by the read mode information corresponding to the determined information terminal device, except for the one or more common functions.

* * * * *